United States Patent
Cucchi et al.

(10) Patent No.: US 8,429,511 B2
(45) Date of Patent: Apr. 23, 2013

(54) EQUIPMENT PROTECTION METHOD AND APPARATUS

(75) Inventors: Silvio Cucchi, Gaggiano (IT); Giuseppe Badalucco, Lissone (IT); Carlo Costantini, Casatenovo (IT); Riccardo Gemelli, Settimo M.se (IT); Luigi Ronchetti, Como (IT)

(73) Assignee: Alcatel Lucent, Paris (FR)

( * ) Notice: Subject to any disclaimer, the term of this patent is extended or adjusted under 35 U.S.C. 154(b) by 764 days.

(21) Appl. No.: 12/592,140

(22) Filed: Nov. 18, 2009

(65) Prior Publication Data
US 2010/0138711 A1    Jun. 3, 2010

(30) Foreign Application Priority Data
Nov. 28, 2008 (EP) .................................... 08305861

(51) Int. Cl.
*G06F 11/00*    (2006.01)
(52) U.S. Cl.
USPC ............ 714/798; 714/752; 708/316; 375/243
(58) Field of Classification Search .................. 714/752; 708/316; 375/243
See application file for complete search history.

(56) References Cited

U.S. PATENT DOCUMENTS 6,516,436 B1 *    2/2003    Dave et al. .................... 714/753
7,782,843 B2 *    8/2010    Zou et al. ....................... 370/360
2005/0232310 A1 *    10/2005    Cabrini et al. ................. 370/539
2007/0263618 A1 *    11/2007    Ornes et al. .................... 370/386
2009/0154342 A1 *    6/2009    Oltman et al. ................. 370/220

FOREIGN PATENT DOCUMENTS

| EP | 1 033 843 | 9/2000 |
| EP | 1 585 358 | 10/2005 |

* cited by examiner

*Primary Examiner* — Scott Baderman
*Assistant Examiner* — Jeison C Arcos
(74) *Attorney, Agent, or Firm* — Carmen Patti Law Group, LLC

(57) ABSTRACT

Equipment protection of a switch matrix (SM) in a network node, which contains a number of matrix modules (M1.1-M4.4, E1.5-E4.6) is achieved by slicing an input signal into k parallel signal slices (x(0)-x(3)) with k>2; coding the k signal slices into a number of n coded signal slices (x(0)-x(5)) with n>k+1 using an error correcting code to add redundancy to said input signal; switching said n coded signal slices through the switching matrix (SM) via n distinct matrix modules; and decoding the n coded signal slices into k decoded signal slices to correct errors introduced while passing through said switch matrix. Preferably, the switch matrix (SM) contains a first number of matrix boards (MB1-MB4, EB5, EB6), each carrying a second number of matrix modules (M1.1-M4.4, E1.5-E4.6). The n coded signal slices are switched via matrix modules on n distinct matrix boards.

15 Claims, 3 Drawing Sheets

EQUIPMENT PROTECTION METHOD AND APPARATUS

The invention is based on a priority application EP 08305861.0 which is hereby incorporated by reference.

FIELD OF THE INVENTION

The present invention relates to the field of telecommunications and more particularly to an equipment protection method and related network node for protecting a switch matrix against failures.

BACKGROUND OF THE INVENTION

In transport networks, reliability requirements for network equipment are very strict since a single failure could affect a large volume of network traffic and thus a large number of connected subscribers. Increased reliability is typically achieved through equipment protection, where critical components within network elements are protected by spare components, which can take over operation in case of a failure. A particularly critical component is the switch matrix of large switching nodes such as digital crossconnects.

One possibility of equipment protection for the switch matrix in a crossconnect system is 1+1 protection. The system is provided with two complete and independent switch matrices, one acting as working or "live" switch matrix and the second as standby switch matrix. This has the advantage, that both matrices can be configured the same and working in parallel, so that in case of failure, the standby matrix can simply be selected to take over operation without requiring prior time-consuming matrix configuration steps. This protection scheme is therefore called hot standby protection. However, it requires a 100% overhead of unused resources and is hence costly.

In large switching nodes, the matrix design is typically modular so that the switch matrix consists of a number of matrix boards. In such arrangement it is possible to implement a N+1 protection scheme, where one spare matrix board is provided to take over operation should one of the N working boards fail. However, in the cases of a failure, the switch matrix must be reconfigured to include the spare matrix board, which is time consuming. Such protection scheme is therefore called cold standby protection.

Even though the hot standby method can be considerably faster than the cold standby method, both are typically not hitless, meaning that a short traffic interruption of at least a few frames will occur. It is however important that equipment protection switching (EPS) is faster than network level protection schemes such as line protection or path protection. In case of a failure of the switching matrix, the equipment protection method should switch before armed line protections can react, i.e. in considerably less than 50 ms.

Moreover the correlation mechanisms that are usually used to determine a failure condition and initiate protection switching are rather slow and not very accurate. Random faults like "single event upsets" for example or errors in the matrix chips cannot be discovered and corrected by EPS mechanisms.

SUMMARY OF THE INVENTION

It is therefore an object of the present invention to provide an improved method and related network node for protecting a switch matrix against failures.

Equipment protection of a switch matrix in a network node, which contains a number of matrix modules is achieved by slicing an input signal into k parallel signal slices with k>2; coding the k signal slices into a number of n coded signal slices with n>k+1 using an error correcting code to add redundancy to said input signal; switching said n coded signal slices through the switching matrix via n distinct matrix modules; and decoding the n coded signal slices into k decoded signal slices to correct errors introduced while passing through said switch matrix and through backplane links.

Preferably, the switch matrix contains a first number of matrix boards, each carrying a second number of matrix modules. The n coded signal slices are switched via matrix modules on n distinct matrix boards.

The proposed equipment protection method is fully hitless and covers also non systematic faults and random errors. It is hence fully error-free.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
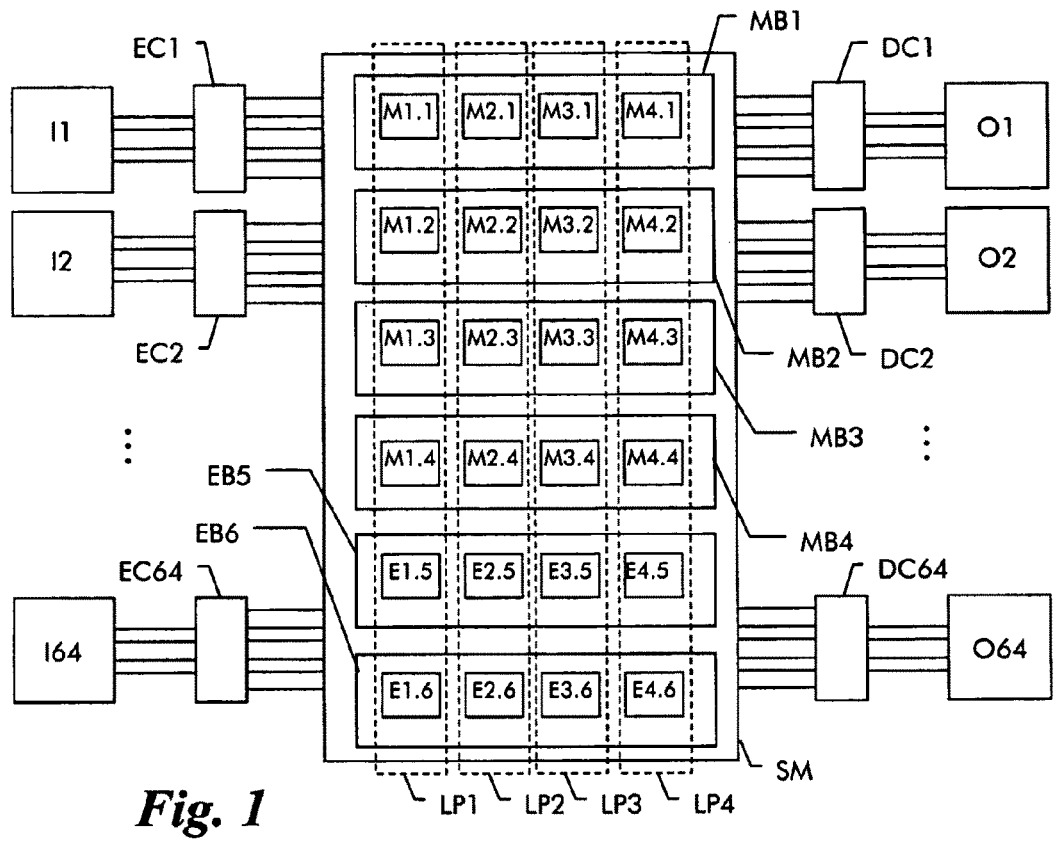
FIG. 1 shows a block diagram of a network element with redundant matrix boards.

A first embodiment of a network element with equipment protected switch matrix is shown in FIG. 1. The network element has 64 input ports I1-I64 and 64 output ports O1-O64. A switch matrix SM establishes crossconnections between any input and output ports as required under control of a matrix controller (not shown). The switch matrix SM contains 6 matrix boards MB1-MB4, EB5, EB6. Each of this matrix boards carries four matrix modules M1.1-M4.4; E1.5-E4.6. The matrix SM has therefore 24 matrix modules in total. Each switch module has a capacity of 64×64 links at a bitrate of 3.5 Gbit/s. Each such signal carries 256 timeslots. Matrix boards EB5, EB6 provide extra switch capacity to protect the four matrix boards MB1-MB4.

The matrix modules can be output driven memory based switches, which are suitable for TDM and packet applications, as described in the applicant's patent EP1699257, which is incorporated by reference herein.

Input ports I1-I64 and output ports O1-O64 are arranged on input/output line cards, each line card having an input and a corresponding output port. Each line card has a capacity of 40 Gbit/s (which corresponds in STS-1 capability to 768 time slots) and is connected to each matrix board by four links at 3.5 Gbit/s, one for each matrix module. In FIG. 1, interconnections are shown only exemplarily. Moreover, inputs and corresponding outputs are shown disjoint for the sake of simplified representation, even though these are actually arranged on the same line cards. Hence, signal flow in FIG. 1 is from left to right.

The design of the network element is based on a sliced architecture of the type described in the applicant's patent EP1585358, which is incorporated by reference herein.

Essentially, in a sliced architecture each data path is distributed across multiple, parallel switching elements in a single stage.

In particular, a certain block of data bytes from a particular line card is spread across four data links, so that the first link carries bits 1 and 2 of each data byte, the second link carries bits 3 and 4, and so on. Subsequent bytes from subsequent time slots are similarly distributed. Each of the four matrix modules then switches two data bits at a time for reassembly at the output line card. In the preferred embodiment, eight bytes of the data signal are sliced into four signals for switching. This results in data words of 16 bits on each internal link. Such data words are referred to as "slices". However, it should be clear that signal slices do not necessarily need to be structured into fixed length words or bit groups but signals can also be sliced on for example a per byte basis.

Usually, the matrix boards in a sliced architecture are designed to handle all signal slices in parallel, i.e. all four parallel slices of a signal to be switched would go to a single matrix board for switching. The number of matrix modules hence corresponds to the number of parallel signal slices.

The embodiment introduces a different concept, according to which the four parallel slices are handled by four different matrix boards, for example by the matrix modules M1.1, M1.2, M1.3, and M1.4 of matrix boards MB1-MB4. An underlying idea is that a matrix board with all its four matrix modules may happen to fail but that it is highly unlikely that two matrix modules on different matrix boards fail at the same time. In case of a failure in the switch matrix, only two bits of each byte would hence be affected.

In order to protect the signal passing through the switch matrix against matrix failures, in another aspect, the embodiment introduces a protection concept based in redundant signal coding. In other words, a signal path through the switch matrix is protected by encoding the signal prior to switching to add redundancy to the signal. In this first embodiment, four signal slices are encoded by adding two redundancy words into 6 encoded slices. In FIG. 1, encoders EC1-EC64 are provided between the input ports I1-I64 and the switch matrix SM and corresponding decoders DC1-DC64 are provided between the switch matrix and the output ports O1-O64.

The six encoded slices are passed to the six matrix boards MB1-MB4, EB5, EB6, which switch them in parallel to the same output. A particular signal path uses hence one matrix module of each matrix board, for example the first ones. From a logical point of view, the switch matrix SM can therefore be represented by a design of four logical switch planes LP1-LP4, where a signal is switched via one logical switch plane from input to output.

Figure 2:
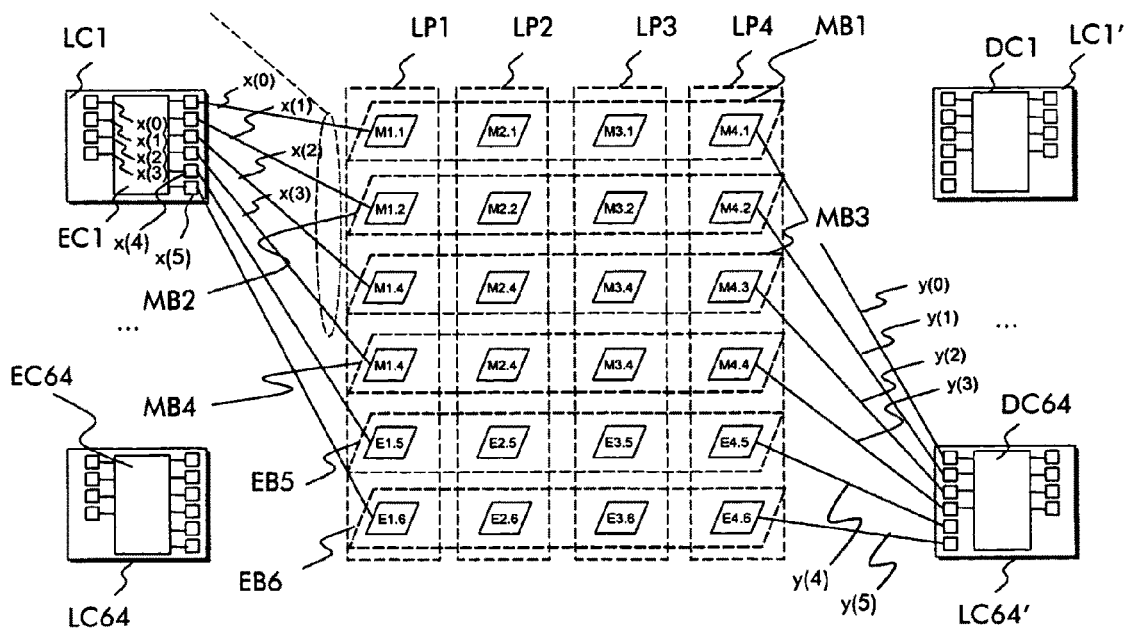
FIG. 2 shows redundant signal transport through the switch matrix.

FIG. 2 shows the signal distribution to and from the switch matrix SM in more detail. A signal (x) to be switched has four signal slices x(0) to x(3). A signal encoder EC1 encodes these four signals into six signal slices x(0) to x(5). These six signal slices are passed in parallel to the six matrix modules M1.1, M1.2, M1.3, M1.4, E1.5, and E1.6, respectively residing on one of the physical matrix boards MB1-MB4, EB5, EB6. These switching modules form the logical switch plane LP1 of the switch matrix SM. To which output port the signal x is switched is not shown in FIG. 2.

Another signal (y) is shown, also encoded into six slices y(0)-y(5), which is switched via logical switch plane LP4 to signal output O64. LP4 includes the matrix modules M4.1, M4.2, M4.3, M4.4, E4.5, and E4.6. FIG. 2 does not shown from which input signal y is coming. Signal y passes from logical switch plane LP4 to signal decodes DC64, which decodes the six signal slices y(0)-y(5) into the original four signal slices y(0)-(3).

In the chosen example, the encoders and decoders are located on the line cards. For example, encoder EC1 is located on line card LC1. A corresponding signal decoder DC1 is located on the same line card, but which is shown as a logically distinct block denoted as LC1', since it relates to the output functions of the line card LC1. In reality, LC and LC1' are the same physical line card. For sake of simplicity, FIG. 2 does not show inputs I1-I64 and output O1-O64, but which are also arranged on the corresponding line cards LC1-LC64.

As explained above with regard to FIG. 1, also FIG. 2 does not show all interconnections between input line cards and matrix boards. Actually, there exist interconnections from each line card to each matrix module. In particular, each of the six outputs of the encoder, which represent the six signal slices, goes to all four matrix devices of a particular logic plane LPi. The same applies to the decoders, which are connected to the output side of the matrix modules. In the shown architecture with 4 matrix boards plus 2 redundant matrix boards each carrying 4 matrix modules, there exist (4+2)*4 links each at a bitrate of 3.5 Gb/s between each input and the switch fabric and from the switch fabric to each output.

In a simplified embodiment, signals can simply be copied ("forked") to the matrix modules and then selected at the switch fabric input ("fork and select"). In the more sophisticated, preferred embodiment, fabric access devices are provided on the line cards in front of the encoders and behind the decoders. Such fabric access devices can be regarded as matrix input and output stages, so that the switch fabric is a multi-stage switch.

As explained above, each line card has a capacity of 768 STS-1 equivalents (40 Gb/s). These 768 time slots are divided by the fabric access device into 4 groups of 192 time slots (10 Gb/s). The 192 time slots will be sent to the first matrix module, the second 192 time slots to the second matrix module on each board and so forth. In other words, a first group of 192 time slots goes to the first logical switch plane LP1, a second group of 192 time slots to the second logical plane LP2 and so forth. It is not required that the groups of 192 timeslots are contiguous; they can be selected in an arbitrary way, for example via a Time Slot Interchange (TSI).

Each group of 192 time slots will be encoded to add redundancy prior to entering the switch fabric SM and decoded after the switch fabric. At the output, a similar fabric access function reassembles the received 4 groups of 192 time slots to form a 40 Gb/s output signal.

Figure 6:
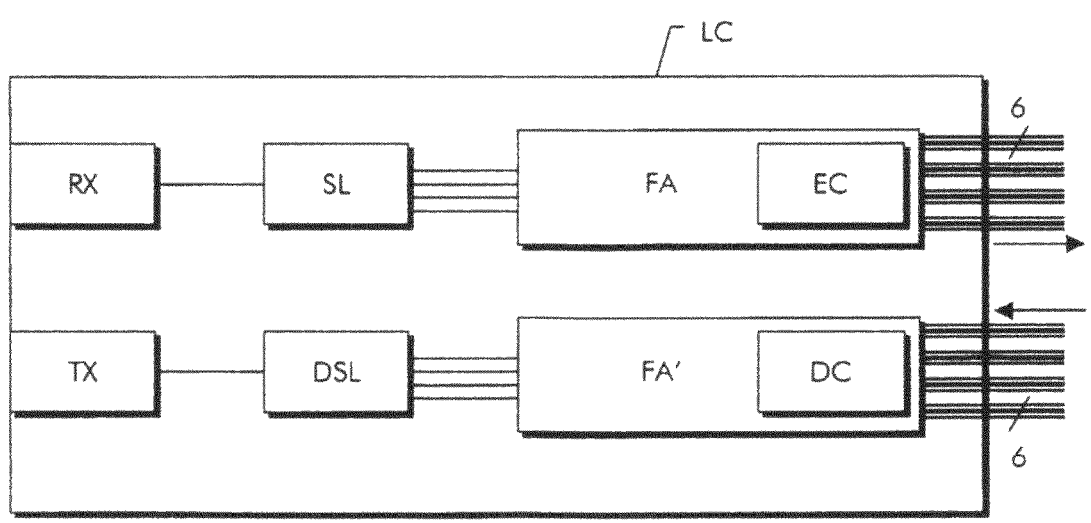
FIG. 6 shows a block diagram of a line card.

FIG. 6 shows an example of a line card LC. It contains in the receive direction an optical receiver RX, which outputs an O/E converted electrical signal to a slicer SL. The output of slicer SL goes to the fabric access module FA, which distributes the time slots to the four logical matrix planes. The fabric access module includes the encoder EC, which generates the encoded 6 signal slices by adding redundancy. The fabric access module FA has four outputs of six parallel signal slices each, which lead to the four logical planes of the switch matrix.

In transmit direction, the line card LC receives from the switch matrix four groups of six connections respectively carrying the six signal slices. These go to a similar fabric access module FA', which reassembles the 4×192 timeslots into an output signal. Fabric access module FA' also includes the signal decoder, which decodes the six slices into the original four slices by correcting errors and removing redundancies. These are fed to a de-slicer DSL from which the de-sliced signal goes to an optical transmitter TX.

As described above, the internal signal links operate at 3.5 Gb/s and can therefore carry in total 256 timeslots. For SDH or SONET applications, only 192 thereof would theoretically be needed. However, considering for example network protection, these 192 timeslots are in practice not enough, since the matrix would also need to support multicast connections. Moreover, other TDM modes such as OTN will also use a higher number of slots. In addition, the network element can also support a data mode where packet data are mapped to an internal sliced format, which will then use a higher number of timeslots, say 204 timeslots in an example, and yet further timeslots may be needed for side-band information.

Figure 3:
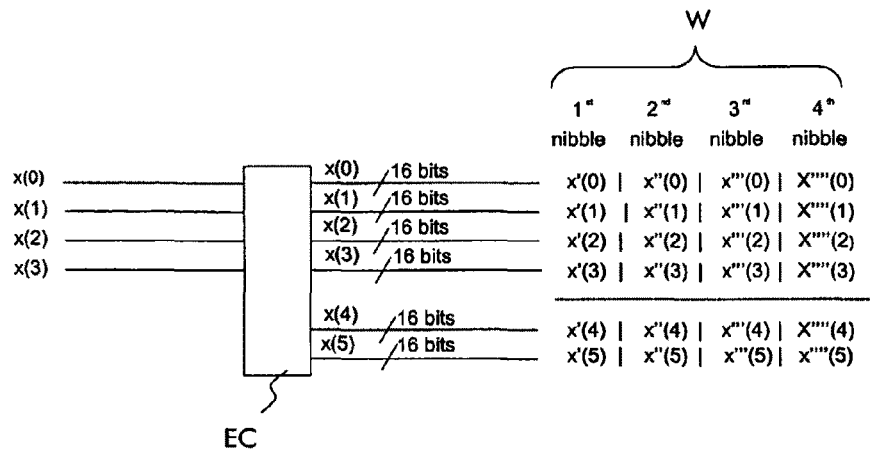
FIG. 3 shows encoding of the signal in a first embodiment before switching.

In the following, different embodiments of the coding and decoding will be explained in more detail. FIG. 3 shows the signal encoding scheme in the first embodiment. Signal x is divided into 4 slices x(0), x(1), x(2), and x(3). Encoder block EC performs an encoding function to add redundancy to the signal. The encoding is based on a block error correcting code, where in general k information symbols plus n−k redundant symbols represent the codeword. In the preferred embodiment, use is made of the well-known Reed-Solomon codes, that are tolerant to n−k known failures or (n−k)/2 unknown failures. Known failures are failures for which the value is unknown but the position is known, while unknown failures are failures for which neither value nor position are known.

Accordingly, encoder EC adds to the signal slices x(0)-x(3) two redundant signal slices x(4) and x(5). As mentioned before, the slicing of the input signal is performed over a words W of 8 bytes. Each signal slice carries two bits of each byte, which makes in total 16 bits per word W. Anyway, other length of words are suitable as well and would not change the concept. The code can be calculated over any number of bits, for example over nibbles (1 nibble=4 bits), bytes or entire 16 bit words.

In the first embodiment, the code is calculated over nibbles. The 8 byte input word W is sliced into 4 slices, each containing a block of 16 bits. The four 16 bit blocks x(0)-x(3) are organized into 4 nibbles:

$$x'(0)\ x''(0)\ x'''(0)\ x''''(0)$$

$$x'(1)\ x''(1)\ x'''(1)\ x''''(1)$$

$$x'(2)\ x''(2)\ x'''(2)\ x''''(2)$$

$$x'(3)\ x''(3)\ x'''(3)\ x''''(3)$$

From these signals, two redundant symbols are calculated as linear combinations of the information symbols, namely:

$$x(4) = \sum_{i \in 0,\ldots,3} p(i) \cdot x(i)$$

$$x(5) = \sum_{i \in 0,\ldots,3} q(i) \cdot x(i)$$

The resulting 6 symbols are shown in FIG. 3. These 6 symbols travel now through the switch matrix SM and reach all the same output port line card. This is the case, because all symbols belong to the same time slot. Potentially, the symbols are corrupted by errors. Errors can be represented by the addition of a symbol e(i):

$$y(i)=x(i)+e(i) i \in 0, \ldots 5.$$

For the following calculations, all math expression (sums, multiplications, powers) are carried over the well known Galois Field GF(16), with elements that can be represented with four bits.

The generator polynomial is $g(x)=(x-\alpha^0)\cdot(x-\alpha^1)$. The decoder DC at the output side computes two linear combinations $S_0$ and $S_1$ named syndromes, on the received 6 symbols:

$$S_0 = \sum_{i=0,\ldots 5} \alpha^{0 \cdot i} y(i) = \sum_{i=0,\ldots 5} \alpha^{0 \cdot i}(x(i)+e(i)) = \sum_{i=0,\ldots 5} \alpha^{0 \cdot i} e(i)$$

$$S_1 = \sum_{i=0,\ldots 5} \alpha^i y(i) = \sum_{i=0,\ldots 5} \alpha^i \cdot (x(i)+e(i)) = \sum_{i=0,\ldots 5} \alpha^i \cdot e(i).$$

wherein $\alpha$ is a primitive element of the field GF(16). The 2 syndromes are both equal to zero if e(i)=0, $\forall i \in 0, \ldots, 5$.

Now the system of two equations can be applied and solved for two different situations: A) for the case of two faults in known position or B) for the case of a single fault in unknown position, i.e. a random error.

Solution A

Let i0 and i1 be the indices of failed boards. The position of the failed boards has to be found out by other means.

$$S_0=e(i0)+e(i1)$$

$$S_1=\alpha^{i0} \cdot e(i0)+\alpha^{i1} \cdot e(i1)$$

The linear system is then solved for e(i0) and e(i1). Since two primitive elements of the generator polynomial g(x) have been used (x(4), x(5)), two unknown can be found. The corresponding recovered symbols are hence:

$$x(i0)=y(i0)-e(i0)$$

$$x(i1)=y(i1)-e(i1)$$

Solution B

In this case the system, which is no more linear, reduces to $$S_0=e(ix)$$

$$S_1=\alpha^{ix} e(ix)$$

Solving the system with respect to the unknown ix and e(ix) gives the result:

$$e(ix) = S_0$$

$$ix = \log_\alpha\left(\frac{S_1}{S_0}\right)$$

With the shown methods (solution A and solution B) different fault correction possibilities are possible.

1) With all 6 matrix boards installed: one random error with both unknown value and unknown position can be recovered.
2) With only 5 matrix boards installed: the switch matrix is fully working, no errors can be recovered but one error can be revealed.
3) With only 4 matrix boards installed: the switch matrix is working, no errors or erasures can be recovered.

This means that during operation, an arbitrary one of the matrix boards can be removed for maintenance purposes without loosing even a single bit. When the position is known in advance, even a second matrix board can be removed and the switch matrix still operates properly.

Figure 4:
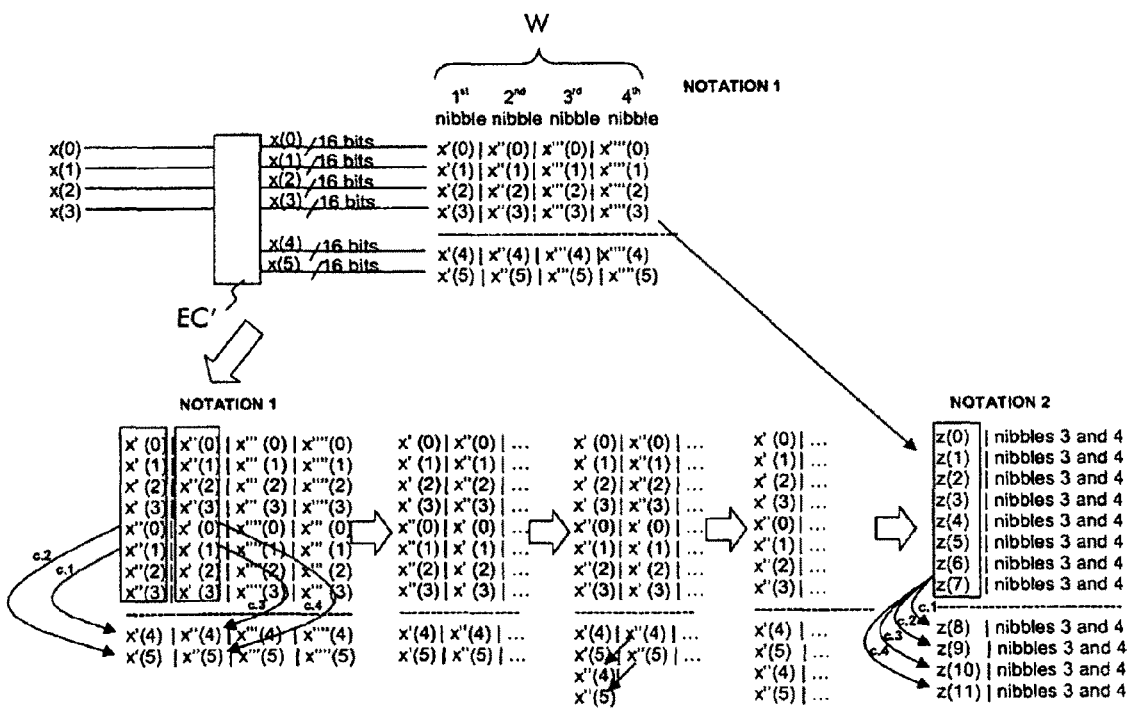
FIG. 4 shows a second embodiment of the signal encoding.

A second embodiment for the signal coding is now described with reference to FIG. 4. As in FIG. 3, there is an input signal x structured into 8 byte wide words W, which is sliced into four slices x(0), x(1), x(2), and x(3), each being 16 bits wide. The 16 bits of each slice are represented by four nibbles as in the first embodiment. However, as opposed to the first embodiment, the code will now be generated over two sets of nibbles. For this purpose, we change the notation as shown in the lower part of FIG. 4. For this purpose, we write the second set of nibbles under the first one and the fourth set of nibbles under the third one. The redundant symbols x(4) and x(5) are written as the last two elements 9 and 10 in each column. From then on, the third and fourth sets of nibbles are no more considered. Their processing is identical to the processing of the first and second sets of nibbles.

In a next step, the redundant symbols of the second set are written under the redundant symbols of the first set of nibbles. This creates a column with 8 signal nibbles and 4 redundant nibbles. The second column does not need to be considered anymore—it is identical to the first one. Finally, we rename the 12 nibbles into signal nibbles z(0) to z(7) and redundant nibbles z(8) to z(11). For the calculation of the redundant symbols z(8) to z(11) a generator polynomial of the of the type $$g(x)=(x-\alpha^0)\cdot(x-\alpha^1)\cdot(x-\alpha^2)\cdot(x-\alpha^3)$$

is used.

The redundant nibbles are calculated as:

$$z(8) = \sum_{i=0,\ldots 7} z(i)\cdot q_0(i)$$
$$z(9) = \sum_{i=0,\ldots 7} z(i)\cdot q_1(i)$$
$$z(10) = \sum_{i=0,\ldots 7} z(i)\cdot q_2(i)$$
$$z(11) = \sum_{i=0,\ldots 7} z(i)\cdot q_3(i)$$

When an error occurs, the output signal y can be written as:

$$y(i)=x(i)+e(i), i=0,\ldots,11$$

At the output side of the switch matrix, the decoder calculates the syndromes $S_i$ $$S_0 = \sum_{i=0,\ldots 11} \alpha^{0\cdot i}\cdot y(i) = \sum_{i=0,\ldots 11} \alpha^0\cdot(x(i)+e(i)) = \sum_{i=0,\ldots 9} \alpha^0\cdot e(i)$$
$$S_1 = \sum_{i=0,\ldots 11} \alpha^{1i}\cdot y(i) = \sum_{i=0,\ldots 11} \alpha^{1i}\cdot(x(i)+e(i)) = \sum_{i=0,\ldots 9} \alpha^{1i}\cdot e(i)$$
$$S_2 = \sum_{i=0,\ldots 11} \alpha^{2i}\cdot y(i) = \sum_{i=0,\ldots 11} \alpha^{2i}\cdot(x(i)+e(i)) = \sum_{i=0,\ldots 9} \alpha^{2i}\cdot e(i)$$
$$S_3 = \sum_{i=0,\ldots 11} \alpha^{3i}\cdot y(i) = \sum_{i=0,\ldots 11} \alpha^{3i}\cdot(x(i)+e(i)) = \sum_{i=0,\ldots 9} \alpha^{3i}\cdot e(i)$$

all equal to 0 if e(i)=0 for all i.

With this set of equations, different fault correction options arise. In particular, since all four primitives of the generator polynomial g(x) have been used, four unknown can be found. This leads to the following solutions:
1) With all 6 matrix boards installed: 2 random errors with both unknown value and unknown positions can be recovered.
2) With only 5 matrix boards installed: one random error with unknown value and unknown position can be recovered.
3) With only 4 matrix boards installed: the switch matrix is working, no errors or erasures can be recovered.

Figure 5:
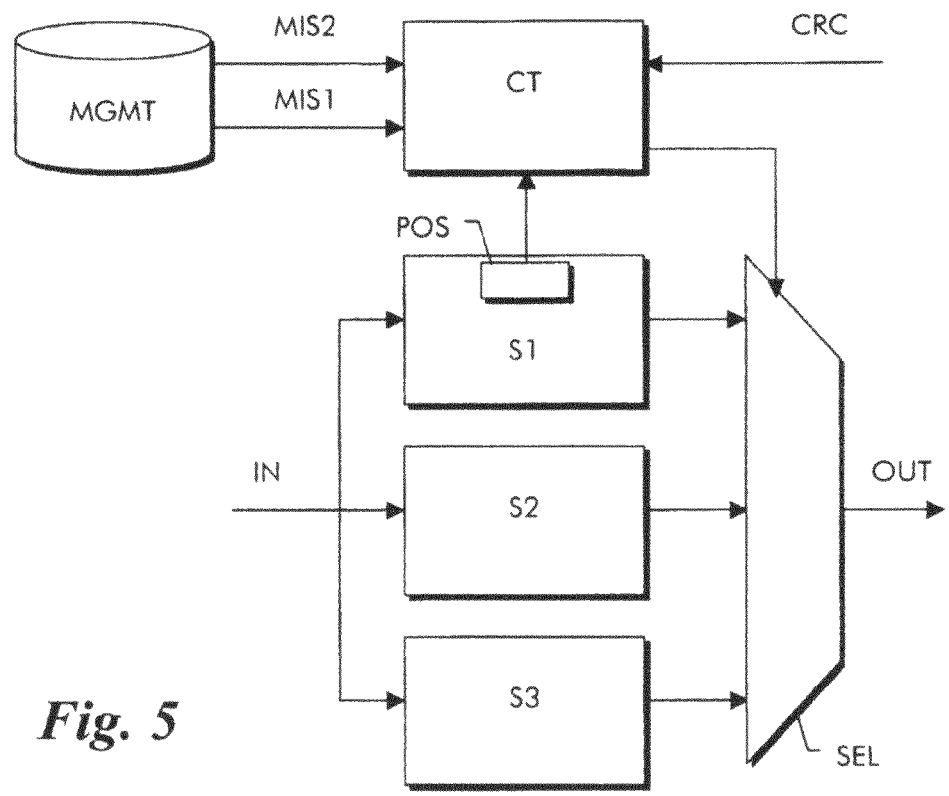
FIG. 5 shows signal decoding after switching using three alternative solvers.

In order to take full benefit from these three options, it is advantageous that at the decoder, different solvers are available. An example of a the signal decoding with different solvers is shown in FIG. 5. The decoder contains three independent solvers S1, S2, S3 for the aforementioned system of equations. The input signal, i.e. the 16 bit wide signal slice x is sent in parallel to all three solvers S1, S2, S3. The output of each solver is connected to a selector SEL, which selects an appropriate one for output. The selector is controlled by a controller CT, which decides the appropriate solver and configures the selector SEL.

The first solver S1 is for the case of 6 working matrix boards installed. The second solver S2 is for the case when one of the six matrix boards is defective or removed for maintenance purposes. The third solver S3 is needed to recover input signal (x(0),X(1),X(2),x(3)) from output signal (y(0),y(1),y(2),y(4)) when two matrix boards are broken or extracted for maintenance purposes. This function is trivial in the case the broken/extracted boards are EB5 and EB6 but it is not for any other matrix boards combination like for instance MB1/MB4 or MB2/EB6.

As explained above, the first solver S1 can detect one random error in arbitrary card position when the 4+2 coding of the first embodiment is used or 2 random errors in arbitrary positions when the 8+4 coding of the second embodiment is used. The solver S1 for both codings is capable not only of correcting the random failure but also of identifying the defective matrix board by the position of the failure. Solver S1 is hence equipped with an interface POS to the controller CT to communicate in case of an error the respective position information to the controller CT. When errors persist on one matrix board or when the decoders for several slices notify errors on the same position, the controller CT decides that a matrix board is defective and selects via selector SEL the second solver for output.

The controller has also two inputs from a superordinate management system MGMT. The management system MGMT has knowledge about hardware defects or removed boards for example via evaluation of alarm messages, via other management interfaces or information manually inputted by operators and informs the selector either via a signal MIS1, if one of the matrix boards is defective or via a signal MIS2 in case two of the matrix boards are defective and of their respective positions. Controller CT can hence configure selector SEL accordingly to switch to the appropriate solver. Moreover, controller CT configures the solvers which matrix boards and hence with signal positions are erroneous.

Since the configuration via a network management interface is rather slow, a further improvement is to use in addition to the redundant symbols an error code like a checksum or CRC per slice to detect the position of a failure. In the above embodiments where slices are structured into 16 bit wide words, for instance a CRC 16 code could be used for this purpose. It should be clear that other mechanism for determining a bit error rate would be equally suitable.

Hence, via a simple checksum or CRC calculation in a subsequent signal processor, the controller can be informed of a faulty bit position and can hence configure the selector and solvers accordingly.

Having considered the above explained embodiments, it should be clear that various modifications are possible. Clearly, it is not necessary that a switch matrix is composed of matrix boards, but a benefit would be achieved as well, if coded signal slices are switched over different matrix modules, thus protecting against failures of these modules. Moreover, the above explained protection mechanisms can be implemented in single stage as well as in multi-stage switching matrices.

The invention claimed is:

1. A method of protecting a switch matrix in a network node, said switch matrix comprising a number of matrix modules; said method comprising the steps of:
    slicing an input signal into k parallel signal slices with k>2;
    coding said k signal slices into a number of n coded signal slices using an error correcting code with n>k+1 to add redundancy to said input signal;
    switching said n coded signal slices through said switching matrix via n distinct matrix modules; and
    decoding said n coded signal slices into k decoded signal slices to correct errors introduced during said switching step, wherein said step of decoding said n signal slices comprises selecting one of two or more equation solvers in dependence of additional information about defective matrix modules.

2. The method according to claim 1, wherein said switch matrix comprises a first number of matrix boards, each comprising a second number of matrix modules and wherein said n coded signal slices are switched via matrix modules on n distinct matrix boards.

3. The method according to claim 2, wherein said number of matrix boards equals n and wherein the number of matrix modules per board equals k.

4. The method according to claim 1, wherein said error correcting code is calculated over a fixed length group of bits from each of said k signal slices.

5. The method according to claim 1, wherein said error correcting code is calculated over two or more fixed length groups of bits from each of said k signal slices.

6. The method according to claim 1, wherein said additional information is either information obtained by one of the equation solvers, by an external management system or from an error code calculation per signal slice.

7. The method according to claim 1, wherein said equation solvers contain a first equation solver for correcting an error in unknown bit position and a second equation solver for detecting and/or correcting a second error together with a first error having known bit position.

8. A network element comprising multiple line cards and a switch matrix controllably interconnecting said line cards; said switch matrix comprising a number of matrix modules; said network element further comprising
    a slicer for slicing an signal to be switched from a first line card to second line card into k parallel signal slices with k>2;
    a signal encoder connected in front of said switch matrix for coding said k signal slices into a number of n coded signal slices using an error correcting code with n>k+1 to add redundancy to said input signal; and
    a signal decoder connected behind of said switch matrix for decoding said n coded signal slices into k decoded signal slices to correct errors introduced while passing through said switch matrix,
    wherein said signal encoder is connected to said switching matrix such that said n coded signal slices pass through said switching matrix via n distinct matrix modules, wherein said signal decoder comprises two or more equation solvers, a selector for selecting one of said equation solvers and a controller for configuring said selector in dependence of additional information about defective matrix modules.

9. The network element according to claim 8, wherein said switch matrix comprises a first number of matrix boards, each comprising a second number of matrix modules and wherein said n coded signal slices are connected to matrix modules on n distinct matrix boards.

10. The network element according to claim 9, wherein said number of matrix boards equals n and wherein the number of matrix modules per board equals k.

11. The network element according to claim 9, wherein each line card comprises a fabric access module for selectively connecting successive signal slices to different matrix modules on same matrix boards.

12. The network element according to claim 11, wherein signal encoders are integrated with said fabric access modules.

13. The network element according to claim 8, wherein a slicer is arranged on each of said line cards.

14. The network element according to claim 8, wherein said additional information is either information obtained by one of the equation solvers, by an external management system or from an error code calculation per signal slice.

15. The network element according to claim 8, wherein said equation solvers contain a first equation solver for correcting an error in unknown bit position and a second equation solver for detecting and/or correcting a second error together with a first error having known bit position.

* * * * *